United States Patent
Kimura et al.

(10) Patent No.: US 9,333,683 B2
(45) Date of Patent: May 10, 2016

(54) HONEYCOMB STRUCTURE AND METHOD FOR MANUFACTURING THE SAME

(71) Applicant: NGK INSULATORS, LTD., Nagoya (JP)

(72) Inventors: Koji Kimura, Nagoya (JP); Takuya Nunome, Nagoya (JP); Shuhei Fujita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 324 days.

(21) Appl. No.: 14/023,792

(22) Filed: Sep. 11, 2013

(65) Prior Publication Data

US 2014/0008839 A1 Jan. 9, 2014

Related U.S. Application Data

(62) Division of application No. 12/854,399, filed on Aug. 11, 2010, now abandoned.

(60) Provisional application No. 61/247,098, filed on Sep. 30, 2009.

(51) Int. Cl.
| | |
|---|---|
| *B29C 43/18* | (2006.01) |
| *B29D 99/00* | (2010.01) |
| *B29L 31/60* | (2006.01) |

(52) U.S. Cl.
CPC ............ *B29C 43/18* (2013.01); *B29D 99/0089* (2013.01); *B29L 2031/608* (2013.01); *Y10T 428/24157* (2015.01)

(58) Field of Classification Search
CPC ...................................................... B29C 43/18
See application file for complete search history.

(56) References Cited

U.S. PATENT DOCUMENTS

| | | |
|---|---|---|
| 5,595,581 A | 1/1997 | Ichikawa et al. |
| 2005/0115215 A1 | 6/2005 | Fujita |
| 2005/0120691 A1 | 6/2005 | Miwa |
| 2005/0153099 A1 | 7/2005 | Yamada |
| 2005/0247038 A1 | 11/2005 | Takahashi |
| 2006/0107641 A1 | 5/2006 | Kasai et al. |

(Continued)

FOREIGN PATENT DOCUMENTS

| | | |
|---|---|---|
| CN | 101384416 A1 | 3/2009 |
| EP | 0 737 801 A1 | 10/1996 |

(Continued)

OTHER PUBLICATIONS

U.S. Appl. No. 12/854,379, filed Aug. 11, 2010, Kimura et al.

(Continued)

*Primary Examiner* — Larry Thrower
(74) *Attorney, Agent, or Firm* — Burr & Brown, PLLC

(57) ABSTRACT

A honeycomb structure includes porous partition walls via which a plurality of cells constituting through channels for a fluid are partitioned; and an outer peripheral wall positioned in the outermost periphery of the structure. Open frontal areas of predetermined cells in an end face of the structure on a fluid inlet side thereof and open frontal areas of remaining cells in an end face of the structure on a fluid outlet side thereof have plugged portions. The outward end faces of the plugged portions are flat, the plugged portions do not have any bubble having a diameter of 0.3 mm or more, and a value obtained by dividing the standard deviation of the plugging depths of the plugged portions by the average plugging depth of the plugged portions is 0.15 or less.

3 Claims, 11 Drawing Sheets

(56) References Cited

U.S. PATENT DOCUMENTS

| | | |
|---|---|---|
| 2006/0185335 A1 | 8/2006 | Ichikawa |
| 2006/0216465 A1 | 9/2006 | Kai et al. |
| 2007/0037703 A1 | 2/2007 | Muroi |
| 2007/0182072 A1 | 8/2007 | Ichikawa et al. |
| 2007/0210485 A1* | 9/2007 | Hatano ............ B28B 11/007 264/259 |
| 2007/0240396 A1 | 10/2007 | Mizutani |
| 2008/0116601 A1 | 5/2008 | Naruse et al. |
| 2008/0164643 A1 | 7/2008 | Ito et al. |
| 2009/0033005 A1 | 2/2009 | Bookbinder et al. |
| 2009/0181167 A1 | 7/2009 | Kimura et al. |
| 2009/0295009 A1 | 12/2009 | Brown et al. |
| 2010/0058725 A1 | 3/2010 | Konomi et al. |

FOREIGN PATENT DOCUMENTS

| | | |
|---|---|---|
| EP | 1 997 556 A1 | 12/2008 |
| JP | 09-193345 A1 | 7/1997 |
| JP | 2004-290766 A1 | 10/2004 |
| JP | 2006-231162 A1 | 9/2006 |
| JP | 2006-310788 A1 | 11/2006 |
| JP | 2009-040046 A1 | 2/2009 |
| WO | 2008/078716 A1 | 7/2008 |

OTHER PUBLICATIONS

Extended European Search Report (EP 10820265.6) dated Mar. 19, 2013.

Japanese Information Statement (Application No. 2011-534138) dated Nov. 11, 2014.

Japanese Information Statement (Application No. 2011-534138) dated Nov. 12, 2013.

Chinese Office Action (Application No. 201080042562.2) dated Nov. 8, 2013.

Chinese Office Action (Application No. 201080042562.2) dated Mar. 28, 2014.

* cited by examiner

200

200

HONEYCOMB STRUCTURE AND METHOD FOR MANUFACTURING THE SAME

CROSS REFERENCE TO RELATED APPLICATIONS

This application is a division of U.S. application Ser. No. 12/854,399 filed Aug. 11, 2010, which in turn claims the benefit under 35 USC §119(e) of U.S. Provisional Application Ser. No. 61/247,098 filed Sep. 30, 2009, the entireties of which are incorporated herein by reference.

BACKGROUND OF THE INVENTION

1. Field of the Invention

The present invention relates to a honeycomb structure and a method for manufacturing the honeycomb structure, and more particularly, it relates to a honeycomb structure which can suppress deformation, cracking or the like due to a temperature change and a method for manufacturing the honeycomb structure.

2. Description of Related Art

There is a rising need to remove fine particles or harmful substances from an exhaust gas of an internal combustion engine, a boiler or the like in consideration of an influence on environment. In particular, regulations on the removal of the fine particles (hereinafter referred to as a particulate matter (PM) sometimes) discharged from a diesel engine tend to be strengthened in Europe, United States and Japan. Moreover, a honeycomb structure is used as a collecting filter for removing such a PM.

Examples of the filter used for such a purpose include a honeycomb filter in which a plugged honeycomb structure is utilized (see, e.g., JP-A-2009-40046 and JP-A-2006-231162). Here, the plugged honeycomb structure comprises porous partition walls via which a plurality of cells constituting through channels for a fluid (an exhaust gas, a purified gas) are partitioned, and an outer peripheral wall positioned in the outermost periphery of the structure. Open frontal areas of predetermined cells in the end face of the filter on a fluid (exhaust gas) inlet side thereof and open frontal areas of remaining cells in the end face of the filter on a fluid (purified gas) outlet side thereof have plugged portions. According to such a honeycomb filter, the exhaust gas flows into the cells through the end face of the filter on the exhaust gas inlet side thereof, the exhaust gas which has flowed into the cells passes through the partition walls, and the exhaust gas (the purified gas) passed through the partition walls is discharged through the end face of the filter on the exhaust gas outlet side thereof. Moreover, when the exhaust gas passes through the partition walls, the PM included in the exhaust gas is collected by the partition walls, and the exhaust gas becomes the purified gas.

SUMMARY OF THE INVENTION

Conventional honeycomb filters include a honeycomb filter in which the outward end faces of the plugged portions are recessed, a honeycomb structure in which plugged portions irregularly have large bubbles therein and a honeycomb filter in which plugged portions have non-uniform plugging depths. When the temperature of the honeycomb filter is raised or lowered, a heat stress is concentrated on a part of the honeycomb filter, thereby causing a damage to the honeycomb filter sometimes.

The present invention has been developed in view of such a conventional technology problem, and an object thereof is to provide a honeycomb structure which can suppress cracking, deformation or the like due to a temperature change, and a method for manufacturing the honeycomb structure.

According to the present invention, there are provided a honeycomb structure and a method for manufacturing the honeycomb structure as follows.

[1] A honeycomb structure comprising: porous partition walls via which a plurality of cells constituting through channels for a fluid are partitioned; and an outer peripheral wall positioned in the outermost periphery of the structure, open frontal areas of predetermined cells in an end face of the structure on a fluid inlet side thereof and open frontal areas of remaining cells in an end face of the structure on a fluid outlet side thereof being provided with plugged portions, wherein the outward end faces of the plugged portions are flat, the plugged portions do not have any bubble having a diameter of 0.3 mm or more, and a value obtained by dividing the standard deviation of the plugging depths of the plugged portions by the average plugging depth of the plugged portions is 0.15 or less.

[2] The honeycomb structure according to [1], wherein the depths of the plugged portions are from 3 to 12 mm.

[3] The honeycomb structure according to [1] or [2], wherein the predetermined cells and the remaining cells are alternately arranged.

[4] The honeycomb structure according to any one of [1] to [3], wherein the material of the partition walls and the plugged portions contains at least one selected from the group consisting of cordierite, mullite, alumina, silicon carbide and aluminum titanate.

[5] A method for manufacturing a honeycomb structure in which the honeycomb structure according to any one of [1] to [4] is manufactured, comprising: a masking process of attaching a sheet to one end face of a formed honeycomb article comprising porous partition walls via which a plurality of cells constituting through channels for a fluid are partitioned and an outer peripheral wall positioned in the outermost periphery of the article, and making holes in the positions of the sheet superimposed on the cells in which plugged portions are to be formed; a first press-in process of pressing the end of the formed honeycomb article, to which the sheet is attached, into a container in which a plugging material is received, to press the plugging material into the cells via the one end face of the formed honeycomb article through the holes formed in the sheet; and a second press-in process of moving, along the surface of the sheet, a press-in jig including a pressurization member having a hardness of 60 to 90 degrees, having a plate-like shape, chamfered along one side of the shape perpendicular to a thickness direction and having a flat face disposed adjacent to the chamfered face in parallel with the thickness direction, in a state where an angle between a pressurization face which is the chamfered face and the sheet is from 15 to 50°, to press, by the pressurization face, the plugging material supplied between the sheet and the pressurization face into the cells in which the plugging material is charged, over the plugging material, through the holes formed in the sheet.

[6] The method for manufacturing the honeycomb structure according to [5], wherein the length of the flat face in the thickness direction of the pressurization member is a length of 20 to 40% of the thickness of the pressurization member.

[7] The method for manufacturing the honeycomb structure according to [5] or [6], wherein the material of the pressurization member contains a rubber.

According to the honeycomb structure of the present invention, the outward end faces of the plugged portions (the end faces directed to the outside of the honeycomb structure) are flat, and the plugged portions do not have any bubble having a diameter of 0.3 mm or more. Furthermore, the value obtained by dividing the standard deviation of the plugging depths of the plugged portions by the average plugging depth of the plugged portions is 0.15 or less. Therefore, it is possible to remarkably decrease the fluctuations of the heat capacity, thermal expansion (coefficient), Young's modulus and the like in each of the plugged portions. When a temperature change or the like occurs, a portion on which a stress is concentrated can be inhibited from being generated, and accordingly, the breakage, deformation or the like of the honeycomb structure during the occurrence of the temperature change or the like can be suppressed.

According to the method for manufacturing the honeycomb structure of the present invention, after charging the plugging material into the cells of the formed honeycomb article, the press-in jig including the pressurization member having the formed pressurization face is moved along the surface of the sheet in the state where the angle between the pressurization face and the sheet is from 15 to 50°, to further charge the plugging material. Therefore, it is possible to manufacture the honeycomb structure in which the outward end faces of the plugged portions (the end faces directed to the outside of the honeycomb structure) are flat, and the plugged portions do not have any bubble having a diameter of 0.3 mm or more. Furthermore, the value obtained by dividing the standard deviation of the plugging depths of the plugged portions by the average plugging depth of the plugged portions is 0.15 or less.

DETAILED DESCRIPTION OF THE INVENTION

Hereinafter, a configuration for carrying out the present invention will specifically be described, but it should be understood that the present invention is not limited to the following embodiment, and is appropriately subjected to design change, improvement or the like based on the ordinary knowledge of a person with ordinary skill in the art without departing from the scope of the present invention.

(1) Honeycomb Structure

Figure 1A:
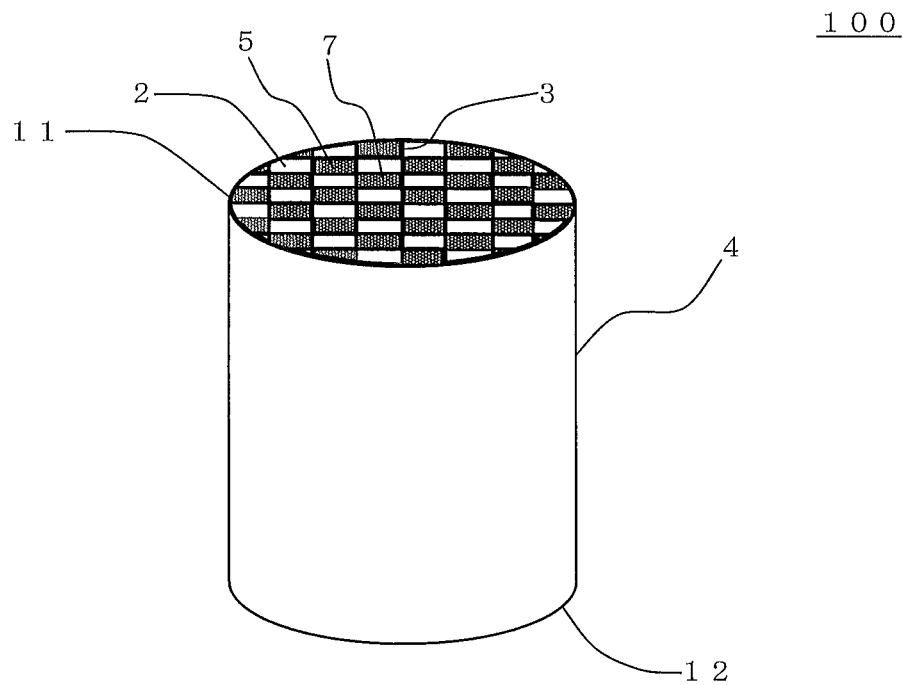
FIG. 1A is a perspective view schematically showing one embodiment of a honeycomb structure of the present invention.
Figure 1B:
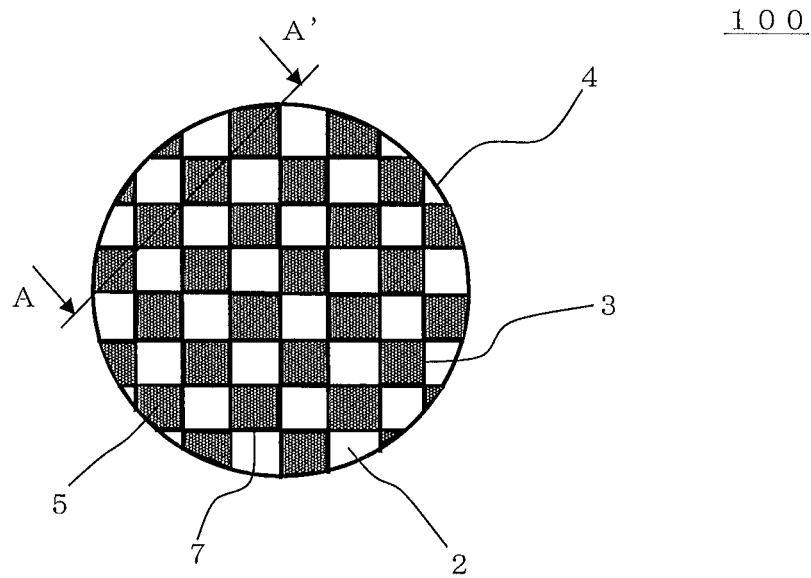
FIG. 1B is a plan view schematically showing the embodiment of the honeycomb structure of the present invention.
Figure 1C:
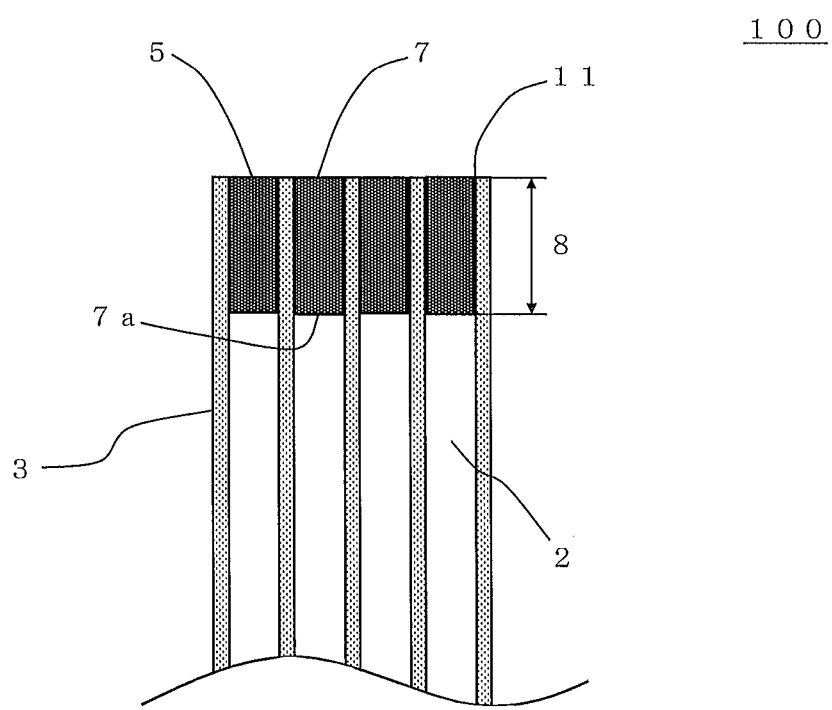
FIG. 1C is a schematic diagram showing a cross section cut along the A-A' line of FIG. 1B.

As shown in FIGS. 1A to 1C, one embodiment of a honeycomb structure of the present invention comprises porous partition walls 3 via which a plurality of cells 2 constituting through channels for a fluid are partitioned; and an outer peripheral wall 4 positioned in the outermost periphery of the structure. Open frontal areas of the predetermined cells 2 in an end face 11 of the structure on a fluid inlet side thereof and open frontal areas of the remaining cells 2 in an end face 12 of the structure on a fluid outlet side thereof have plugged portions 5. Outer end faces 7 of the plugged portions 5 are flat, the plugged portions 5 do not have any bubble having a diameter of 0.3 mm or more, and a value obtained by dividing the standard deviation of plugging depths 8 of the plugged portions 5 by the average plugging depth of the plugged portions 5 is 0.15 or less.

Here, 'the outer end faces 7' of the plugged portions 5 are, as shown in FIG. 1C, the end faces directed to the outside of the honeycomb structure 100 (exposed to the outside) to face an outer space, among the end faces of the plugged portions 5. It is to be noted that among the end faces of the plugged portions 5, end faces opposite to 'the outer end faces 7' are 'inward end faces 7a' shown in FIG. 1C. Moreover, 'the outer end faces 7 of the plugged portions 5 are flat' mean a state where any recess having a depth larger than 0.3 mm or any protrusion of 0.3 mm or more is not formed in the outer end faces 7 of the plugged portions 5. Moreover, 'bubbles' are spaces formed in the plugged portions 5 and having a diameter of 0.3 mm or more. Furthermore, the presence/absence of the bubbles is judged by enlarging, twice, the cross section of each of the plugged portions 5 cut along the plane including the central axis thereof to observe the cross section with a microscope and judging whether or not the space having a diameter of 0.3 mm or more is formed. The diameter of each bubble is seen in 'the cross section of the plugged portion 5 cut along the plane of the plugged portion 5 including the central axis thereof'. The diameter of the bubble is a value measured in a state where the bubble is enlarged twice by an optical microscope. 'The diameter of the bubble in the cross section of the plugged portion 5 cut along the plane of the plugged portion 5 including the central axis thereof' is a corresponding diameter calculated from the area of the bubble in the cross section. 'The corresponding diameter calculated from the area of the bubble' is the diameter of 'a circular shape' having an area equal to that of the bubble in the cross section. Moreover, 'the standard deviation of the plugging depths 8 of the plugged portions 5' is the standard deviation of the plugging depths 8 of 20 plugged portions, when the 20 plugged portions are arbitrarily selected. Moreover, 'the average plugging depth of the plugged portions 5' means the average value of the plugging depths of the 20 plugged portions from which 'the standard deviation of the plugging depths 8 of the plugged portions 5' is calculated as described above. Moreover, 'the depths of the plugged portions 5' mean the lengths of the plugged portions 5 in the extending direction of the cells 2.

FIG. 1A is a perspective view schematically showing one embodiment of the honeycomb structure of the present invention. FIG. 1B is a plan view schematically showing the embodiment of the honeycomb structure of the present invention. FIG. 1C is a schematic diagram showing a cross section cut along the A-A' line of FIG. 1B.

Thus, in a honeycomb structure 100 of the present embodiment, the outer end faces 7 of the plugged portions 5 (the end faces directed to the outside of the honeycomb structure) are flat, and the plugged portions 5 do not have any bubble having a diameter of 0.3 mm or more. Furthermore, the value obtained by dividing the standard deviation of the plugging depths 8 of the plugged portions 5 by the average plugging depth of the plugged portions is 0.15 or less. Therefore, it is possible to decrease the fluctuations of the heat capacity, thermal expansion (coefficient), Young's modulus and the like in each of the plugged portions. When a temperature change or the like occurs, a portion on which a stress is concentrated can be inhibited from being generated, and accordingly, the generation of the breakage, deformation or the like during the occurrence of the temperature change or the like can be suppressed.

In the honeycomb structure of the present embodiment, the outer end faces 7 of the plugged portions 5 are flat. In consequence, during the regeneration of the honeycomb structure or the like, 'the distribution (fluctuation) of heat based on the irregularities of the end faces of the plugged portions' decreases, and a thermal shock resistance improves. Measurement for judging whether or not the outer end faces 7 of the plugged portions 5 of the honeycomb structure are flat (flatness) are performed by a laser microscope.

In the honeycomb structure of the present embodiment, the plugged portions 5 do not have any bubble having a diameter of 0.3 mm or more. In consequence, the plugged portions substantially have a solid structure. During the regeneration of the honeycomb structure or the like, the distribution (fluctuation) of the heat of the plugged portions in the end face of the honeycomb structure decreases, and the thermal shock resistance improves.

In the honeycomb structure of the present embodiment, the value obtained by dividing 'the standard deviation of the plugging depths 8 of the plugged portions 5' by 'the average plugging depth of the plugged portions 5' is 0.15 or less, preferably from 0.03 to 0.1. In consequence, during the regeneration of the honeycomb structure or the like, the distribution (fluctuation) of the heat of the plugged portions in the end face of the honeycomb structure decreases, and the thermal shock resistance improves. Moreover, the depths of the plugged portions entirely become uniform, and hence the PM collection areas of the partition walls can easily be controlled, so that the fluctuations of the PM collection performances of honeycomb structure products can be decreased. When the value obtained by dividing 'the standard deviation of the plugging depths 8 of the plugged portions 5' by 'the average plugging depth of the plugged portions 5' is larger than 0.15, during the regeneration of the honeycomb structure or the like, the distribution (fluctuation) of the heat of the plugged portions in the end face of the honeycomb structure increases, and the thermal shock resistance deteriorates. Moreover, since the depths of the plugged portions entirely become non-uniform, and hence the PM collection areas of the partition walls cannot easily be controlled, with the result that the fluctuations of the PM collection performances of honeycomb structure products increase.

In the honeycomb structure of the present embodiment, the depths 8 of the plugged portions 5 are preferably from 3 to 12 mm, further preferably from 5 to 10 mm. When the depths are smaller than 3 mm, the strength of the plugged portions 5 deteriorates sometimes. When they are larger than 12 mm, the PM collection areas of the partition walls 3 decrease sometimes.

In the honeycomb structure 100 of the present embodiment, open frontal areas of predetermined cells 2 in the end face 11 on a fluid inlet side and open frontal areas of remaining cells in the end face 12 on a fluid outlet side have the plugged portions 5. Moreover, the predetermined cells and the remaining cells are alternately arranged (side by side), and the plugged portions and 'the open frontal areas of the cells' preferably form checked patterns in the inlet side end face 11 and the outlet side end face 12.

In the honeycomb structure of the present embodiment, the material of the partition walls 3 and the plugged portions 5 preferably contains at least one selected from the group consisting of cordierite, mullite, alumina, silicon carbide and aluminum titanate. Moreover, the material of the partition walls 3 and the plugged portion 5 is further preferably at least one selected from the group consisting of cordierite, mullite, alumina, silicon carbide and aluminum titanate, and the material of the partition walls 3 and the plugged portion 5 is especially preferably one selected from the group consisting of cordierite, mullite, alumina, silicon carbide and aluminum titanate. Furthermore, the material of the plugged portions 5 is preferably the same as that of the partition walls 3.

In the honeycomb structure 100 of the present embodiment, the average pore diameter of the partition walls 3 is preferably from 10 to 40 µm, further preferably from 10 to 30 µm. With the average pore diameter smaller than 10 µm, even when a less amount of particulate matter is deposited, a pressure loss increases sometimes. When it is larger than 40 µm, the honeycomb structure 100 becomes brittle and easily breaks down sometimes. The average pore diameter of the partition walls 3 is a value measured with a mercury porosimeter.

In the honeycomb structure 100 of the present embodiment, the porosities of the partition walls 3 are preferably from 30 to 70%, further preferably 35 to 60%. When the porosities are smaller than 30%, the pressure loss increases sometimes. When they are larger than 70%, the honeycomb structure 100 becomes brittle and easily breaks down sometimes. The porosities of the partition walls 3 are values measured with the mercury porosimeter.

In the honeycomb structure 100 of the present embodiment, the thicknesses of the partition walls 3 are preferably from 200 to 300 μm, further preferably from 250 to 300 μm. When the thicknesses are smaller than 200 μm, the strength of the honeycomb structure 100 deteriorates sometimes. When they are larger than 300 μm, the pressure loss during the passage of the exhaust gas through the cells increases sometimes.

In the honeycomb structure 100 of the present embodiment, the cell density of the cross section perpendicular to the cell extending direction is preferably from 46.5 to 62.0 cells/cm$^2$. When the cell density is smaller than 46.5 cells/cm$^2$, the strength of the honeycomb structure 100 deteriorates sometimes. When it is larger than 62.0 cells/cm$^2$, the pressure loss increases sometimes.

In the honeycomb structure 100 of the present embodiment, there is not any special restriction on a cell shape, but the cell shape is a polygonal shape such as a triangular, quadrangular, pentangular or hexagonal shape, a circular shape or an elliptic shape, or may be another irregular shape in the cross section perpendicular to the cell extending direction. Moreover, a combination of these shapes may be used. Furthermore, in the cross section of the honeycomb structure 100 perpendicular to the cell extending direction, the sectional areas of the cells are preferably equal, but the sectional areas of the predetermined cells 2 including the plugged portions 5 on the side of the inflow side end face 11 (the sectional areas in the cross section of the structure perpendicular to the cell extending direction) are smaller than the sectional areas of the remaining cells 2 including the plugged portions 5 on the side of the outflow side end face 12 (the sectional areas in the cross section of the structure perpendicular to the cell extending direction) in a preferable configuration.

Figure 8A:
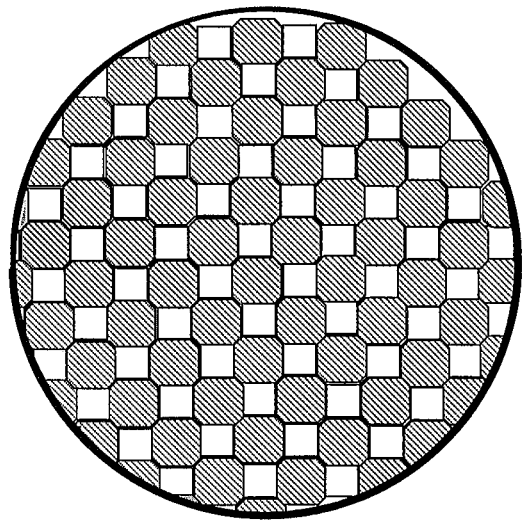
FIG. 8A is a plan view schematically showing a honeycomb structure 200 manufactured by another embodiment of the method for manufacturing the honeycomb structure of the present invention.
Figure 8B:
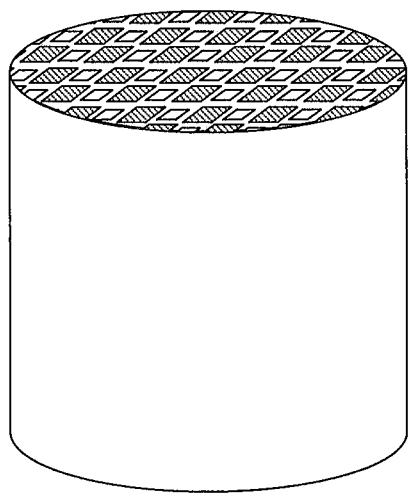
FIG. 8B is a perspective view schematically showing the honeycomb structure 200 manufactured by the embodiment of the method for manufacturing the honeycomb structure of the present invention.

There is not any special restriction on the outer shape of the honeycomb structure 100 of the present embodiment, but examples of the outer shape include a cylindrical shape, an elliptic tubular shape, 'a tubular shape with a bottom surface having a polygonal shape, e.g., a square tubular shape or the like', and a tubular shape with a bottom surface having an irregular shape. Moreover, there is not any special restriction on the size of the honeycomb structure 100, but the honeycomb structure is formed so that the ratio of the length of the formed honeycomb article in the axial direction with respect to the outer diameter of the formed honeycomb article (the length/the outer diameter) is preferably from 0.1 to 0.8, further preferably from 0.1 to 0.6. Furthermore, when the honeycomb structure 100 has another shape, the area of the bottom surface thereof is preferably in the same range as that of the bottom surface of the above cylindrical shape. In addition, in FIG. 1, all the cells have a square shape and an equal size, but as in the shape of a honeycomb structure 200 shown in FIGS. 8A and 8B, the sizes of the adjacent cells of the honeycomb structure may be changed to increase a PM collection capacity. In the cross section of the honeycomb structure 200 perpendicular to the cell extending direction shown in FIGS. 8A and 8B, cells having large sectional areas and cells having small sectional areas are alternately arranged. FIG. 8A is a plan view schematically showing another embodiment of the honeycomb structure of the present invention. FIG. 8B is a perspective view schematically showing the other embodiment of the honeycomb structure of the present invention.

In the honeycomb structure 100 of the present embodiment, the outer peripheral wall positioned in the outermost periphery may be an integrally formed wall formed integrally with the formed honeycomb article during forming, or a cement coat wall formed by grinding the outer periphery of the formed honeycomb article into a predetermined shape after the forming, and making an outer peripheral wall of cement or the like. When the outer peripheral wall is the integrally formed wall, the thickness of the outer peripheral wall is preferably from 0.5 to 1.5 mm. This also applies to a case where the outer peripheral wall is the cement coat wall. Moreover, when the outer peripheral wall is the cement coat wall, examples of the material of the cement coat wall is a material obtained by adding a flux component such as glass to a common raw material.

In the honeycomb structure 100 of the present embodiment, a catalyst for burning and removing the particulate matter, a catalyst for removing a harmful substance such as $NO_x$ from the exhaust gas or the like may be loaded on the surfaces of the partition walls 3 in accordance with a use application.

(2) Method for Manufacturing Honeycomb Structure:

Next, one embodiment of the method for manufacturing the honeycomb structure of the present invention will be described. The method for manufacturing the honeycomb structure of the present invention is a method for manufacturing the above honeycomb structure of the present invention, and the above embodiment of the honeycomb structure of the present invention can be manufactured by the embodiment of the method for manufacturing the honeycomb structure of the present invention.

First, a tubular formed honeycomb article is formed of a ceramic forming material containing a ceramic material, and comprises partition walls via which a plurality of cells constituting through channels for a fluid are partitioned and an outer peripheral wall positioned in the outermost periphery of the article.

The ceramic material contained in the ceramic forming material preferably contains at least one selected from the group consisting of a cordierite forming material, cordierite, mullite, alumina, silicon carbide and aluminum titanate, is further preferably at least one selected from the group consisting of the cordierite forming material, cordierite, mullite, alumina, silicon carbide and aluminum titanate, and is especially preferably one selected from the group consisting of the cordierite forming material, cordierite, mullite, alumina, silicon carbide and aluminum titanate. It is to be noted that the cordierite forming material is a ceramic material obtained by blending a chemical composition in a range of 42 to 56 mass % of silica, 30 to 45 mass % of alumina and 12 to 16 mass % of magnesia, and the material is fired to form cordierite.

Moreover, this ceramic forming material is preferably prepared by mixing the above ceramic material with a dispersion medium, an organic binder, an inorganic binder, a pore former, a surfactant and the like.

To form the article of the ceramic forming material, the forming material is first kneaded to obtain a kneaded clay, and the obtained kneaded clay is preferably formed into a honeycomb shape. There is not any special restriction on a method for kneading the forming material to form the kneaded clay, but examples of the method include methods in which, for example, a kneader, a vacuum clay kneader and the like are used. There is not any special restriction on a method for forming the formed honeycomb article of the kneaded clay, and a heretofore known forming method such as extrusion forming or injection forming may be used. Preferable examples of the method include a method for extrusion-forming the formed honeycomb article by use of a die having a desirable cell shape, partition wall thickness and cell density. As the material of the die, a hard alloy which does not easily wear is preferable.

Moreover, after the above forming, the resultant formed honeycomb article may be dried. There is not any special restriction on a drying method, but examples of the method include hot air drying, microwave drying, dielectric drying, reduced pressure drying, vacuum drying and freeze drying. Above all, the dielectric drying, microwave drying and hot air drying are preferably performed alone or as a combination of them. Moreover, drying conditions are preferably set to a drying temperature of 80 to 150° C. and a drying time of five minutes to two hours.

Next, the resultant formed honeycomb article is preferably fired. It is to be noted that the firing may be performed after forming the plugged portions in the formed honeycomb article.

Moreover, the formed honeycomb article is preferably calcinated before firing (finally firing) the formed honeycomb article. The calcinating is performed for degreasing, and there is not any special restriction on a calcinating method as long as an organic substance (the organic binder, dispersion medium, pore former or the like) contained in the formed honeycomb article can be removed. In general, the burning temperature of the organic binder is from about 100 to 300° C., and the burning temperature of the pore former is from about 200 to 800° C., whereby as calcinating conditions, the article is preferably heated in an oxidizing atmosphere at about 200 to 1000° C. for about 3 to 100 hours.

The formed honeycomb article is fired (finally fired) to sinter and densify the forming material constituting the formed and calcinated article, thereby acquiring a predetermined strength. Firing conditions (temperature, time and atmosphere) vary in accordance with the type of the forming material, and hence appropriate conditions may be selected in accordance with the type of the forming material. When, for example, the cordierite forming material is used, a firing temperature is preferably from 1410 to 1440° C. Moreover, a firing time is preferably from four to six hours.

Next, a plugging material is charged into the open frontal areas of the predetermined cells (first cells) in the end face of the formed honeycomb article on the fluid inlet side thereof, and the open frontal areas of the remaining cells (second cells) in the end face of the article on the fluid outlet side thereof, whereby the above embodiment of the honeycomb structure of the present invention is preferably obtained which has the plugged portions in the open frontal areas of the predetermined cells (the first cells) in the end face of the article on the fluid inlet side thereof and the open frontal areas of the remaining cells (the second cells) in the end face of the article on the fluid outlet side thereof.

Examples of a method for charging the plugging material into the formed honeycomb article include a method comprising a masking process of attaching a sheet to one end face of a formed honeycomb article comprising porous partition walls via which a plurality of cells constituting through channels for a fluid are partitioned and an outer peripheral wall positioned in the outermost periphery of the article, and making holes in the positions of the sheet superimposed on the cells in which plugged portions are to be formed; a first press-in process of pressing the end of the formed honeycomb article to which the sheet is attached into a container in which a plugging material is received to press the plugging material into the cells via the one end face of the formed honeycomb article through the holes formed in the sheet; and a second press-in process of moving, along the surface of the sheet, a press-in jig including 'a pressurization member having a plate-like shape and having a face chamfered along one side of the shape perpendicular to a thickness direction and a flat face disposed adjacent to the chamfered face in parallel with the thickness direction', to press, by a pressurization face which is the chamfered face, the plugging material supplied between the sheet and the pressurization face into the cells in which the plugging material is charged, over the plugging material, through the holes formed in the sheet. Moreover, after forming the plugged portions in the one end face, the plugged portions are also formed in the other end face by a similar method, to obtain the honeycomb structure of the present invention.

Hereinafter, the method for charging the plugging material into the formed honeycomb article will be described in more detail.

Figure 2A:
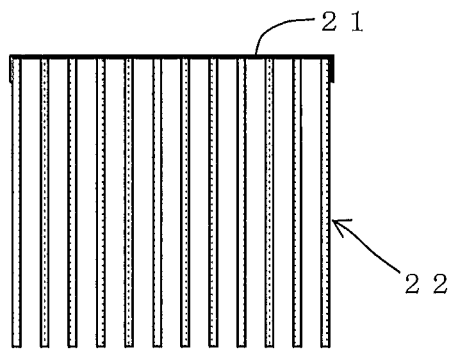
FIG. 2A is a schematic diagram showing a part of a process in one embodiment of a method for manufacturing a honeycomb structure of the present invention.
Figure 2B:
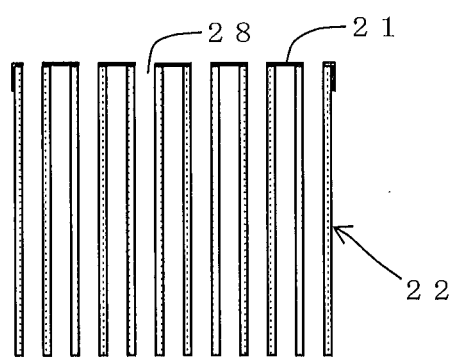
FIG. 2B is a schematic diagram showing a part of the process in the embodiment of the method for manufacturing the honeycomb structure of the present invention.

First, as shown in FIGS. 2A and 2B, a sheet 21 is attached to one end face of a formed honeycomb article 22 comprising porous partition walls via which a plurality of cells constituting through channels for a fluid are partitioned and an outer peripheral wall positioned in the outermost periphery of the article, and holes 28 are made in positions of the sheet 21 superimposed on the cells in which plugged portions are to be formed (the masking process). FIG. 2A is a schematic diagram showing a part of the process in one embodiment of the method for manufacturing a honeycomb structure of the present invention. FIG. 2B is a schematic diagram showing a part of the process in the embodiment of the method for manufacturing the honeycomb structure of the present invention.

As the material of the sheet 21, a polyester-based resin is preferable. Above all, polyethylene terephthalate (PET) is further preferable. The thickness of the sheet 21 is preferably from 30 to 70 μm.

To form the holes 28 in the sheet 21, the end face of the formed honeycomb article 22 is preferably beforehand photographed by an image pickup device to acquire image data with which the shapes and positions of the cells in which the plugged portions are to be formed and the cells in which the plugged portions are not to be formed can be specified. Moreover, holes are preferably made in 'the portions of the sheet superimposed on the cells in which the plugged portions are to be formed' based on the acquired image data by a laser. There is not any special restriction on the image pickup device, but examples of the device include a charge-coupled device (CCD) camera and a complementary metal oxide semiconductor (CMOS) sensor.

Figure 2C:
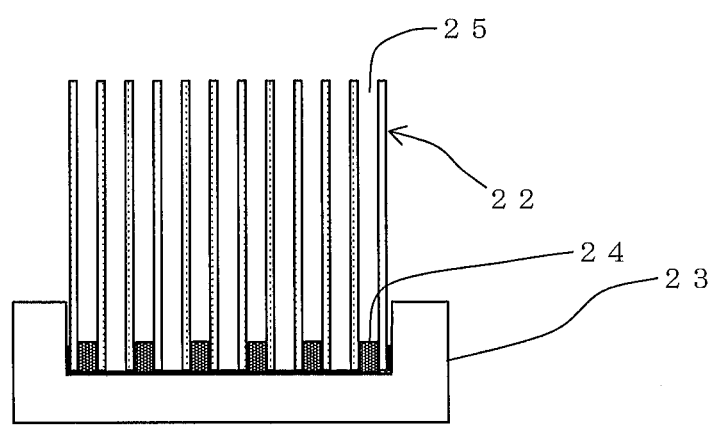
FIG. 2C is a schematic diagram showing a part of the process in the embodiment of the method for manufacturing the honeycomb structure of the present invention.
Figure 2D:
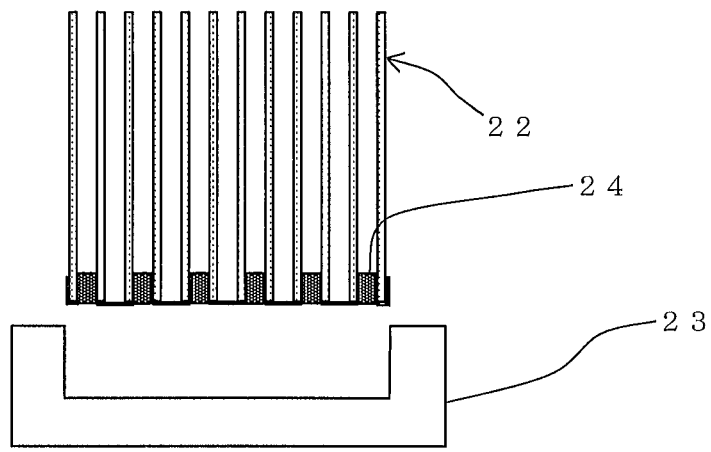
FIG. 2D is a schematic diagram showing a part of the process in the embodiment of the method for manufacturing the honeycomb structure of the present invention.

Next, as shown in FIG. 2C, the end of the formed honeycomb article 22 to which the sheet is attached is pressed into a container (a container for plugging) 23 in which a plugging material 24 is received to press the plugging material 24 into cells 25 via the one end face of the formed honeycomb article 22 through the holes formed in the sheet (the first press-in process). Moreover, after pressing the plugging material 24 into the cells 25, as shown in FIG. 2D, the formed honeycomb article is extracted from the container 23 for plugging. To press the end of the formed honeycomb article 22 into the container 23 for plugging, the end of the formed honeycomb article 22 is directed downwards in a vertical direction, and the formed honeycomb article 22 is preferably moved downwardly in the vertical direction. FIG. 2C is a schematic diagram showing a part of the process in the embodiment of the method for manufacturing the honeycomb structure of the present invention. FIG. 2D is a schematic diagram showing a part of the process in the embodiment of the method for manufacturing the honeycomb structure of the present invention.

As the plugging material, a material used as the material of the partition walls is preferably used, and the amount of the dispersion medium is preferably regulated so that the viscosity of the material at 25° C. is from 100 to 300 dPa·s.

Figure 4A:
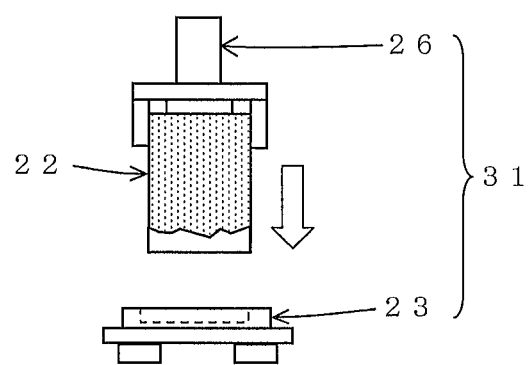
FIG. 4A is a side view schematically showing a first press-in device in a manufacturing apparatus used in the embodiment of the method for manufacturing the honeycomb structure of the present invention.
Figure 4B:
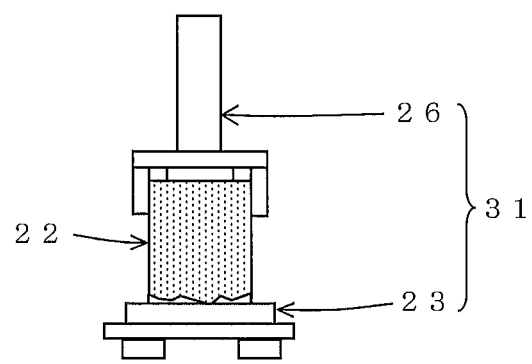
FIG. 4B is a side view schematically showing the first press-in device in the manufacturing apparatus used in the embodiment of the method for manufacturing the honeycomb structure of the present invention.

In the first press-in process, as shown in FIGS. 4A and 4B, it is preferable to use a first press-in device 31 comprising the container 23 for plugging in which the plugging material is received, and press-in means 26 for pressing, into the container 23 for plugging in which the plugging material is received, the end of the formed honeycomb article 22 including the porous partition walls via which a plurality of cells constituting the through channels for the fluid are partitioned and the outer peripheral wall positioned in the outermost periphery of the article, to charge the plugging material into the cells through the end face of the formed honeycomb article 22. FIG. 4A is a side view schematically showing the first press-in device in a manufacturing apparatus used in one embodiment of a method for manufacturing the honeycomb structure of the present invention. FIG. 4B is a side view schematically showing the first press-in device in the manufacturing apparatus used in the embodiment of the method for manufacturing the honeycomb structure of the present invention.

There is not any special restriction on the container 23 for plugging, in which the plugging material is received, as long as the one end of the formed honeycomb article can be inserted into the container 23 for plugging, to charge, into the cells, the plugging material received in the container 23 for plugging. There is not any special restriction on the material of the container 23 for plugging, but stainless steel or the like may be used. Moreover, the thickness of the container 23 for plugging is preferably from 20 to 40 mm, and the inner diameter of the container 23 for plugging is preferably from 101 to 105% of the diameter of the end face of the formed honeycomb article.

The press-in means 26 preferably includes a grasping portion which grasps the formed honeycomb article, and a pressurization mechanism which moves the formed honeycomb article 22 upwards and downwards in the vertical direction in a state where the article is grasped. Subsequently, the formed honeycomb article is preferably pressed into the container 23 for plugging, by use of the pressurization mechanism. There is not any special restriction on the grasping portion, but examples of the grasping portion include a grasping portion including two plates having mutually facing surfaces which are provided with an elastic material such as rubber so that the elastic material can come in contact with the formed honeycomb article to sandwich the formed honeycomb article between the two plates. Moreover, examples of the pressurization mechanism include a mechanism which moves the grasping portion upwards and downwards by a motor or the like.

Furthermore, the first press-in device 31 may have a constitution in which the formed honeycomb article is fixed by the press-in means 26, and the container 23 for plugging is moved upwards and downwards in the vertical direction. In this case, the container 23 for plugging is preferably disposed on a table, and the table is moved upwards and downwards in the vertical direction by the motor.

Figure 2E:
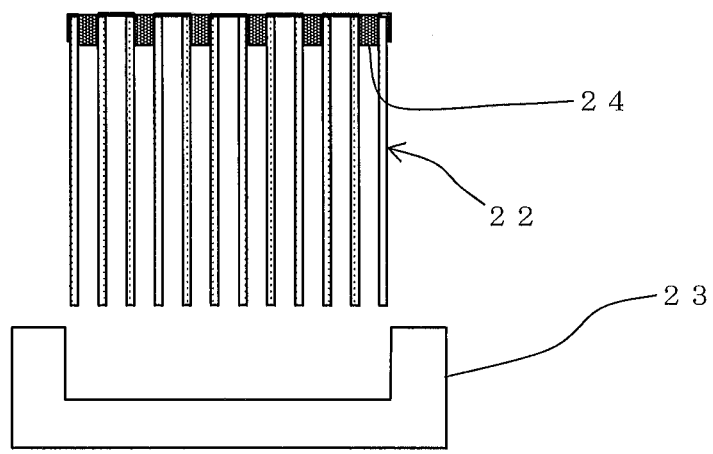
FIG. 2E is a schematic diagram showing a part of the process in the embodiment of the method for manufacturing the honeycomb structure of the present invention.

Next, as shown in FIG. 2E, the formed honeycomb article 22 is preferably inverted so that the end face of the article in which the plugging material 24 is charged is directed upwardly in the vertical direction. There is not any special restriction on a method for inverting the formed honeycomb article 22, an inverting device may be used, and the article may manually (manpower) be inverted, but the inverting device is preferably used. FIG. 2E is a schematic diagram showing a part of the process in the embodiment of the method for manufacturing the honeycomb structure of the present invention.

Figure 5:
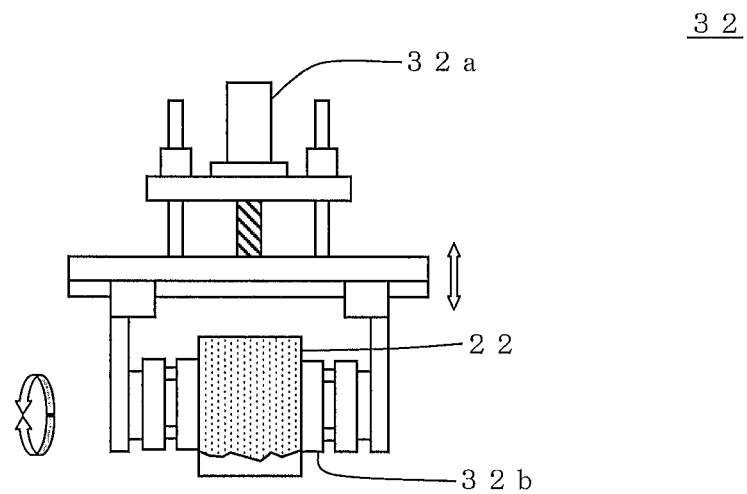
FIG. 5 is a side view schematically showing a device for inverting the formed honeycomb article (an inverting device) in the manufacturing apparatus used in the embodiment of the method for manufacturing the honeycomb structure of the present invention.

When the formed honeycomb article is inverted, an inverting device 32 shown in FIG. 5 is preferably used. The inverting device 32 preferably comprises an inverting mechanism 32b which grasps and inverts the formed honeycomb article 22 and an elevating mechanism 32a which moves the inverting mechanism 32b grasping the formed honeycomb article 22 upwards and downwards. The elevating mechanism 32a and the inverting mechanism 32b are preferably driven by the motor or the like. FIG. 5 is a side view schematically showing the device which inverts the formed honeycomb article (the inverting device) in the manufacturing apparatus used in the embodiment of the method for manufacturing the honeycomb structure of the present invention.

Figure 2F:
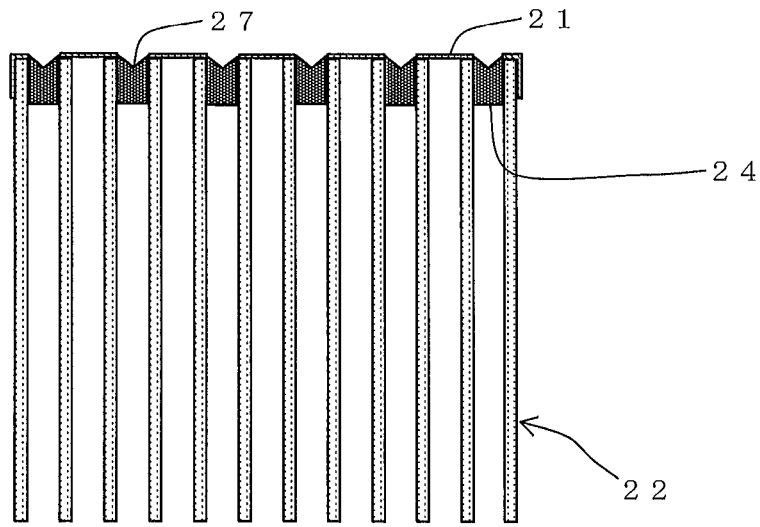
FIG. 2F is a schematic diagram showing the state of a formed honeycomb article in a case where the plugging material is recessed in the embodiment of the method for manufacturing the honeycomb structure of the present invention.

It is to be noted that in a state where the formed honeycomb article is inverted to dispose the plugging material in the end face of the article directed upwardly in the vertical direction, as shown in FIG. 2F, the end face of the plugging material (the end face directed to the upside of the vertical direction) is recessed, and recess portions 27 are formed sometimes. However, in the method for manufacturing the honeycomb structure of the present embodiment, these recesses can be eliminated in the next second press-in process. FIG. 2F is a schematic diagram showing the state of the formed honeycomb article in a case where the plugging material is recessed in the embodiment of the method for manufacturing the honeycomb structure of the present invention.

Figure 2G:
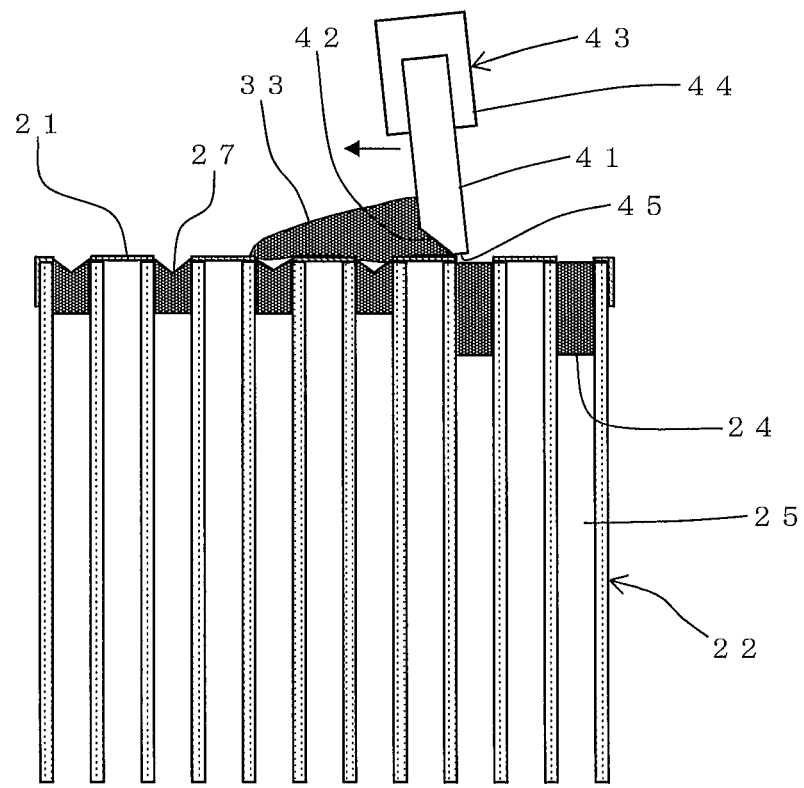
FIG. 2G is a schematic diagram showing a part of the process in the embodiment of the method for manufacturing the honeycomb structure of the present invention.
Figure 3A:
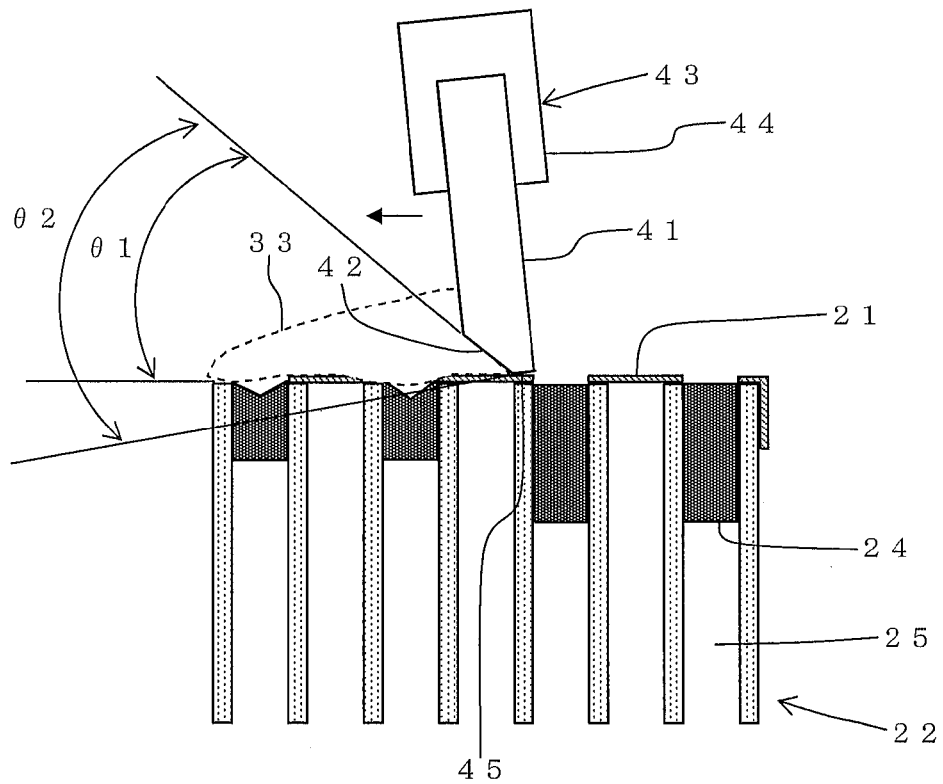
FIG. 3A is a schematic diagram showing a part of the process in the embodiment of the method for manufacturing the honeycomb structure of the present invention.

Next, as shown in FIGS. 2G and 3A, a press-in jig 43 including 'a pressurization member 41 having a hardness of 60 to 90 degrees, having a plate-like shape, chamfered along one side of the shape perpendicular to a thickness direction and having a flat face 45 disposed adjacent to the chamfered face in parallel with the thickness direction' is moved along the surface of the sheet 21, in a state where an angle θ1 (hereinafter referred to as 'the attack angle θ1 sometimes) between a pressurization face 42 which is the chamfered face and the sheet 21 is from 15 to 50°, to press, by the pressurization face 42, the plugging material supplied between the sheet 21 and the pressurization face into the cells in which the plugging material is charged, over the plugging material, through the holes formed in the sheet 21 (the second press-in process). Thus, the plugging material is charged by the pressurization face 42 in a state where the angle θ1 between the pressurization face 42 of the pressurization member 41 and the sheet 21 is from 15 to 50°, whereby bubbles can be prevented from being in the plugged portions, or recesses can be prevented from being formed in the end faces of the plugged portions. FIG. 2G is a schematic diagram showing a part of the process in the embodiment of the method for manufacturing the honeycomb structure of the present invention. FIG. 3A is a schematic diagram showing a part of the process in the embodiment of the method for manufacturing the honeycomb structure of the present invention.

The attack angle θ1 is from 15 to 50°, preferably 30 to 45°. When the angle is smaller than 15°, the bubbles are undesirably formed in the plugged portions. When it is larger than 50°, the bubbles are undesirably formed in the plugged portions, or the recesses are formed in the end faces of the plugged portions.

Figure 3B:
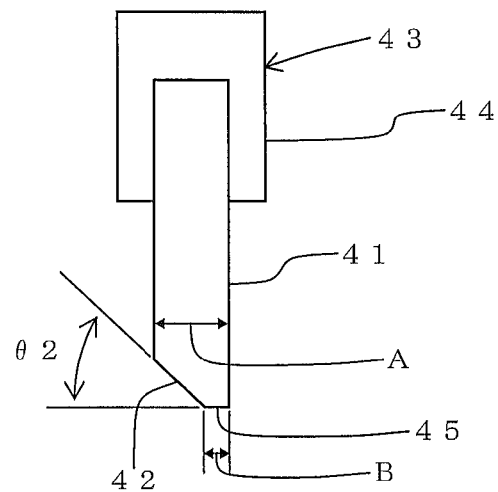
FIG. 3B is a schematic diagram showing the cross section of a press-in jig used in the embodiment of the method for manufacturing the honeycomb structure of the present invention.

As shown in FIG. 3B, in the method for manufacturing the honeycomb structure of the present embodiment, the press-in jig 43 includes 'the pressurization member 41 having a hardness of 60 to 90 degrees, having a plate-like shape, chamfered along one side (ridgeline) of the shape perpendicular to the thickness direction and having the flat face 45 disposed adjacent to the chamfered face (the pressurization face 42) in parallel with the thickness direction'. Furthermore, the jig includes a support portion 44 which supports the end of the pressurization member 41 on the end face side opposite to the flat face 45. The material of the support portion 44 is preferably aluminum or stainless steel. Here, 'chamfered along the one side perpendicular to the thickness direction' means that there is formed a state where the one side and a part of two faces which sandwich the one side therebetween are removed. Therefore, 'the one side' in 'chamfered along the one side' has already been removed, and is not present in the pressurization member. Moreover, in the pressurization member, 'the chamfered face (the pressurization face 42)' is formed by 'removing the one side and a part of the two faces which sandwich the one side therebetween'. Therefore, the pressurization member has 'the chamfered face (the pressurization face 42)' formed by 'removing the one side and a part of the two faces which sandwich the one side therebetween'. It is to be noted that the pressurization member is 'chamfered along the one side perpendicular to the thickness direction', but this expression specifies a position to be chamfered, and it does not means that when the pressurization member is manufactured, the process of 'chamfering the member along the one side perpendicular to the thickness direction' is necessarily performed. As shown in FIG. 3B, the sectional shape of the pressurization member 41 cut along a plane thereof perpendicular to the pressurization face 42 and the flat face 45 is pentangular. FIG. 3B is a schematic diagram showing the cross section of the press-in jig used in the embodiment of the method for manufacturing the honeycomb structure of the present invention.

The hardness of the pressurization member 41 is from 60 to 90 degrees, preferably 60 to 80 degrees. When the hardness is lower than 60 degrees, the pressurization member softens, whereby the bubbles are unfavorably formed in the plugged portions, or the recesses are formed in the end faces of the plugged portions. When it is higher than 90 degrees, the pressurization member hardens, whereby the bubbles are unfavorably formed in the plugged portions, or the recesses are formed in the end faces of the plugged portions. The hardness of the pressurization member is a value measured by a method conforming to K6253.

Moreover, as shown in FIGS. 3A and 3B, in the cross section of the pressurization member 41 of the press-in jig 43 cut along the plane perpendicular to both the pressurization face 42 and the flat face 45, a tilt angle (a small side angle) (a pressurization face tilt angle) θ2 with respect to the flat face 45 of the pressurization face 42 is preferably from 15 to 80°, further preferably 30 to 75°. The pressurization face tilt angle θ2 is an angle (the small side angle) formed between a face extended from the flat face 45 to a pressurization face 42 side and the pressurization face 42.

Moreover, as to the flat face 45 of the pressurization member 41, 'a length B in the thickness direction of the pressurization member 41' is preferably from 20 to 40% of the thickness of the pressurization member 41. When the length is smaller than 20%, the rigidity of the pressurization member deteriorates, and the plugging material is not easily supplied to the recess portions sometimes. When it is larger than 40%, the rigidity rises, and plugging is completed sometimes while the bubbles are left.

Figure 3C:
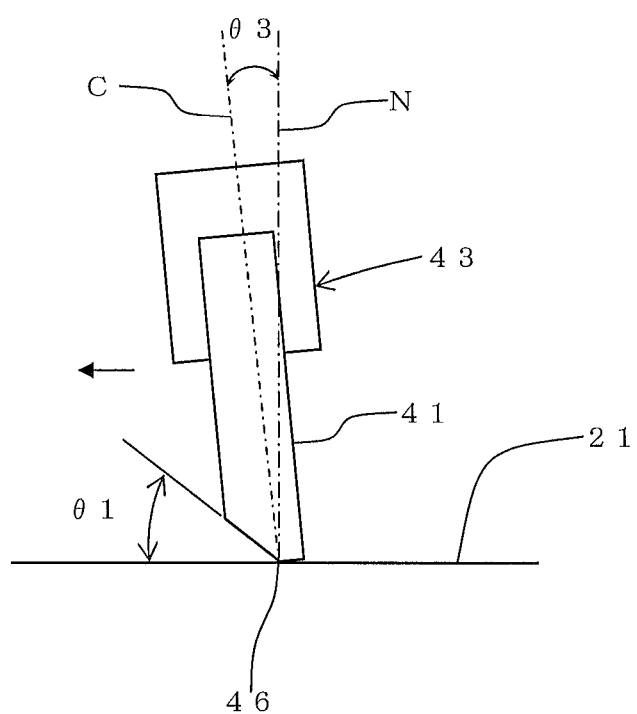
FIG. 3C is a schematic diagram showing a state where the press-in jig is disposed in the end face of the formed honeycomb article (the surface of the sheet) in another embodiment of the method for manufacturing the honeycomb structure of the present invention.

In the method for manufacturing the honeycomb structure of the present invention, as shown in FIG. 3C, when the press-in jig is moved along the surface of the sheet 21 attached to the end face of the formed honeycomb article, an angle (a small side angle) (a pressurization member tilt angle) θ3 formed between the pressurization member and a normal line N of the sheet is preferably from 0 to 30°. Moreover, the pressurization member tilt angle θ3 and the pressurization face tilt angle θ2 are preferably regulated in the above ranges to set the attack angle θ1 to 15 to 50°. Here, the pressurization member tilt angle θ3 is formed between a line extending in a direction perpendicular to the thickness direction (a pressurization member reference line C) and the normal line N in the cross section perpendicular to both the pressurization face and the flat face, and it is the small side angle. Moreover, as shown in FIG. 3C, the pressurization member tilt angle θ3 is the angle of the pressurization member tilted so as to fall down along a proceeding direction (a direction in which the press-in face is formed). When the pressurization member tilt angle θ3 is 0°, the press-in jig is moved along the surface of the sheet 21 in a state where the flat face 45 comes in contact with the sheet 21. Moreover, when the pressurization member tilt angle θ3 is larger than 0°, the press-in jig is moved along the surface of the sheet 21 in a state where the sheet 21 comes in contact with a ridgeline with which the flat face 45 and the pressurization face 42 come in contact. FIG. 3C is a schematic diagram showing a state where the press-in jig is disposed on the end face of the formed honeycomb article (the surface of the sheet) in another embodiment of the method for manufacturing the honeycomb structure of the present invention.

There is not any special restriction on the shape of the pressurization face 42 constituting the pressurization member 41, but the shape is preferably rectangular. The thickness of the pressurization member 41 is preferably from 6 to 10 mm. Moreover, the length of the pressurization member 41 in a direction perpendicular to the thickness direction (a reference line direction) in the cross section perpendicular to both the pressurization face and the flat face (the length of the portion of the member which is not supported by the support portion 44) is preferably from 15 to 25 mm. Furthermore, the length of the pressurization member 41 in a direction perpendicular to both the thickness direction and the reference line direction is preferably from (D+10) to (D+20) mm, in which D (mm) is the diameter of the formed honeycomb article as a plugging material charging target. The pressurization face 42 preferably has such a size that when the pressurization face is moved along the end face of the formed honeycomb article, the face moves over the whole end face of the formed honeycomb article (the upside of the vertical direction).

The material of the pressurization member 41 preferably contains a rubber, and is specifically preferably urethane rubber or silicone rubber.

When the plugging material is charged by the press-in jig 43, the press-in jig 43 is preferably moved along the surface of the sheet 21 while pressing the end face of the formed honeycomb article by the press-in jig 43. At this time, the pressure to press the end face of the formed honeycomb article by the press-in jig 43 (downwardly in the vertical direction) is preferably from 0.2 to 0.5 MPa, further preferably from 0.3 to 0.5 MPa. When the pressure is smaller than 0.2 MPa, the plugging material is not easily charged. When it is larger than 0.5 MPa, the end of the formed honeycomb article easily breaks down.

When the press-in jig 43 is moved along the end face of the formed honeycomb article 22 (the surface of the sheet), a moving speed is preferably from 100 to 400 mm/second. When the speed is lower than 100 mm/second, the amount of the plugging material to be supplied decreases, and a recessed shape is easily left in the surface of the structure, which deteriorates the production efficiency of the honeycomb structure sometimes. When the speed is higher than 400 mm/second, the plugging material is not easily uniformly charged into the cells of the honeycomb structure sometimes.

The plugging material used in the second press-in process is preferably the same as the plugging material used in the first press-in process.

Figure 6:
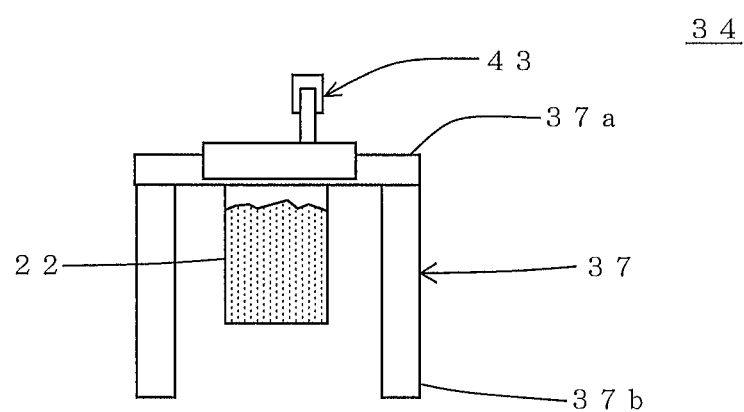
FIG. 6 is a side view schematically showing a second press-in device in the manufacturing apparatus used in the embodiment of the method for manufacturing the honeycomb structure of the present invention.

In the second press-in process, a second press-in device 34 shown in FIG. 6 is preferably used which comprises the press-in jig 43 including a pressurization member having a formed pressurization face, and further presses, by the pressurization member, the plugging material into the cells over the plugging material charged in the cells of the formed honeycomb article 22. It is to be noted that the second press-in process may be performed manually without using the second press-in device 34. FIG. 6 is a side view schematically showing the second press-in device of the manufacturing apparatus used in the embodiment of the method for manufacturing the honeycomb structure of the present invention.

As shown in FIG. 6, the second press-in device 34 preferably comprises a fixing table 37 for fixing the formed honeycomb article 22. The fixing table 37 shown in FIG. 6 includes a table portion 37a and a leg portion 37b. In the table portion 37a, there is preferably formed a hole into which the end of the formed honeycomb article can be inserted. Moreover, the formed honeycomb article is preferably inserted into the hole, and fixed in a state where the end face of the formed honeycomb article is positioned on the same plane as the upper surface of the table portion 37a (the surface directed upwardly in the vertical direction), and the plugging material is preferably charged into the cells in this state.

When the second press-in process is performed using the second press-in device 34, the formed honeycomb article having the one end face side in which the plugging material is charged is fixed to the fixing table 37 so as to fix the one end face side thereof to the table portion 37a. Afterward, the press-in jig including 'the pressurization member having the plate-like shape, chamfered along one side of the shape perpendicular to the thickness direction and having the flat face disposed adjacent to a chamfered face in parallel with the thickness direction is moved along the surface of the sheet in a state where the attack angle θ1 is from 15 to 50°, to press, by the pressurization face, the plugging material supplied between the sheet and the pressurization face into the cells in which the plugging material is charged, over the plugging material, through the holes formed in the sheet.

Moreover, the press-in jig 43 is preferably moved by a pressurization mechanism for moving the jig in a direction perpendicular to the end face of the formed honeycomb article (upwards and downwards in the vertical direction), and a driving mechanism for moving the jig along the end face of the formed honeycomb article (the surface of the sheet). The pressurization mechanism is preferably a mechanism for moving the pressurization member upwards and downwards in the vertical direction by an air pressure, an oil pressure or the like. The driving mechanism is preferably a mechanism for moving the jig in a horizontal direction by the motor or the like.

Figure 7:
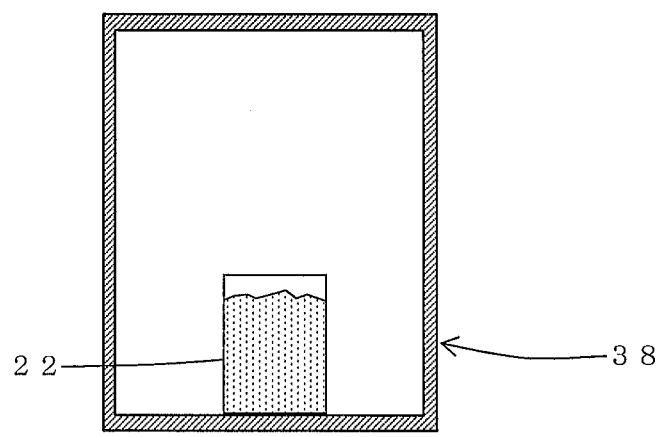
FIG. 7 is a schematic diagram showing the cross section of a drying device in the manufacturing apparatus used in the embodiment of the method for manufacturing the honeycomb structure of the present invention.

Next, the plugging material charged in the formed honeycomb article is preferably dried to form the plugged portions (a drying process). In the drying process, a drying device 38 shown in FIG. 7 is preferably used. FIG. 7 is a side view schematically showing the drying device 38 in the embodiment of the manufacturing apparatus of the honeycomb structure of the present invention.

Examples of the drying device include a hot air drying device, a hot plate and a far infrared drier. A drying temperature is preferably from 150 to 200° C. A drying time is preferably from one to three minutes.

In the method for manufacturing the honeycomb structure of the present invention, after forming the plugged portions in the predetermined cells of one end face of the formed honeycomb article, the plugged portions are preferably formed in the remaining cells of the other end face of the article by the same method, to obtain the honeycomb structure of the present invention.

EXAMPLES

Hereinafter, the present invention will further specifically be described with respect to examples, but the present invention is not limited to these examples.

Example 1

A plurality of components selected from the group consisting of talc, kaolin, calcinated kaolin, alumina, aluminum hydroxide and silica were combined to prepare a cordierite forming material at a predetermined ratio so that a chemical composition of the material contained 42 to 56 mass % of $SiO_2$, 30 to 45 mass % of $Al_2O_3$ and 12 to 16 mass % of MgO. To 100 parts by mass of the cordierite forming material, as a pore former, 10 to 20 parts by mass of graphite was added. Furthermore, appropriate amounts of methyl celluloses and a surfactant were added thereto, respectively, to prepare a kneaded clay. The prepared kneaded clay was subjected to vacuum deaeration, and extruded to obtain a formed honeycomb article comprising partition walls via which a plurality of cells were partitioned and an outer peripheral wall.

Next, the resultant formed honeycomb article was dried at 180° C. for three minutes, and fired at 1420° C. for five hours. The resultant formed honeycomb article had a partition wall thickness of 0.3 mm, a cell density of 46.5 cells/cm$^2$, a porosity (a partition wall porosity) of 45% and an average pore diameter (a partition wall average pore diameter) of 25 μm. The porosity and average pore diameter were measured with a mercury porosimeter.

Next, plugged portions were formed in the resultant formed honeycomb article to form checkered patterns in both the end faces, thereby obtaining a honeycomb structure. The plugged portions were formed appropriately using devices (a first press-in device 31, a second press-in device 34, an inverting device 32 and a drying device 38) shown in FIGS. 4A to 7. The first press-in device 31 has a holding portion capable of holding and transferring the formed honeycomb article, a plugging material supply mechanism and a pressurization mechanism. The device holds the formed honeycomb article while the press-in face of the article is disposed on the downside. After supplying the desirable amount of the plugging material to a container 23, the device pressurizes the end face of the formed honeycomb article opposite to the press-in face thereof to press the plugging material into the article. The inverting device 32 has a holding portion capable of holding and transferring the formed honeycomb article, a rotation mechanism and a driving mechanism. In the second press-in device, the press-in face of the article needs to be disposed on the upside in a vertical direction, and hence the inverting device removes the formed honeycomb article from the container 23, and rotates the formed honeycomb article to direct the press-in face of the article upwardly in the vertical direction. Moreover, by the driving mechanism, the formed honeycomb article can be installed in a conveyance mechanism of the second press-in device. The second press-in device 34 comprises a positioning mechanism for positioning and holding the formed honeycomb article in a desirable position, a supply mechanism for supplying the desirable amount of the plugging material, a pressurization member, a driving mechanism for the pressurization member, and a conveyance mechanism, and the device presses the plugging material into the formed honeycomb article by the press-in jig 43, thereby forming the plugged portions. The drying device 38 has a conveyance mechanism and a chamber portion, and performs drying in a state where at least the plugged portions of the formed honeycomb article are included in a chamber. The drying device shown in FIG. 7 shows the only chamber portion. A plurality of chamber portions may be disposed.

To form the plugged portions, first, a sheet was attached to one end face of the formed honeycomb article, and holes were made in positions of the sheet superimposed on the cells in which the plugged portions were to be formed (a masking process). The material of the sheet was polyethylene terephthalate (PET), and the thickness thereof was 25 μm. The holes were made in the sheet by a laser.

Next, the end of the formed honeycomb article to which the sheet was attached was pressed into a container for plugging, in which a plugging material was received, to press the plugging material into cells via the one end face of the formed honeycomb article through the holes formed in the sheet (a first press-in process). As the plugging material, 40 mass % of kaolin having an average particle diameter of 5 μm, 40 mass % of talc having an average particle diameter of 40 μm, 15 mass % of aluminum oxide having an average particle diameter of 10 μm and 5 mass % of silica having an average particle diameter of 5 μm were used as main inorganic components. The viscosity of the plugging material was 250 dPa·s at 25° C.

Next, the plugging material was further pressed into the cells in which 'the plugging material was charged, over 'the existing plugging material (a second press-in process). The second press-in process was performed using the second press-in device 34 shown in FIG. 6. The formed honeycomb article having the one end face side in which the plugging material was charged was fixed to a fixing table 37 so as to fix the one end face side thereof to a table portion 37*a*. Afterward, the press-in jig including 'a pressurization member having a plate-like shape, chamfered along one side perpendicular to a thickness direction, and having a flat face disposed adjacent to a chamfered face in parallel with the thickness direction' was moved along the surface of the sheet in a state where an attack angle θ1 was from 15 to 50°, and the plugging material supplied between the sheet and the pressurization face was preferably pressed by the pressurization face into the cells in which the plugging material was charged, over the plugging material, through the holes formed in the sheet. Moreover, when the press-in jig was moved along the surface of the sheet, the jig was moved while pressing the end face of the formed honeycomb article by the press-in jig. A pressure at this time (the pressure) was set to 0.4 MPa. Moreover, the material of the press-in jig was urethane rubber. Furthermore, the hardness of the pressurization member was 70 degrees, and a pressurization face tilt angle θ2 was 45°. In addition, a pressurization member tilt angle θ3 was 5°, and an attack angle θ1 was 40°. Moreover, as to the flat face of the pressurization member, a ratio (a flat end face ratio) of 'the length of the flat face in the thickness direction of the pressurization member' with respect to the thickness of the pressurization member was 30%. The hardness of the pressurization member was a value measured by a method conforming to JIS K6253.

Next, the plugged portions were dried using the drying device to obtain the honeycomb structure. As the drying device, a hot air drier was used. The drying temperature was set to 180° C., and the drying time was set to three minutes.

As to the obtained honeycomb structure, 'the presence/absence of the bubble (having a diameter of 0.3 mm or more) of the plugged portion' and 'the presence/absence of the recess (having a depth of 0.3 mm or more) of the surface (the end face) of the plugged portion' were evaluated. Results are shown in Table 1. In Table 1, 'the hardness' indicates the hardness of the pressurization member. 'The bubble' indicates the presence/absence of the bubble of the plugged portion. 'The recess' indicates the presence/absence of the recess in the surface (the end face) of the plugged portion.

Presence/Absence of Plugged Portion

Each plugged portion is cut along 'the plane of the plugged portion including the central axis thereof', and the cross section is enlarged twice by a microscope, to observe whether or not a bubble having a diameter of 0.3 mm or more is present.

Presence/Absence of Recess of Surface (End Face) of Plugged Portion

The plugged portion is cut along 'the plane of the plugged portion including the central axis thereof', and the cross section is enlarged twice by a microscope, to observe whether or not a recess having a depth of 0.3 mm or more is present in 'the end face (the surface) of the plugged portion directed to the outside of the honeycomb structure'.

TABLE 1

|  | Attack angle θ1 (°) | Pressurization face tilt angle θ2 (°) | Pressurization member tilt angle θ3 (°) | Hardness (degree) | Flat face ratio (%) | Bubble | Recess |
| --- | --- | --- | --- | --- | --- | --- | --- |
| Ex. 1 | 50 | 50 | 0 | 70 | 25 | None | None |
| Ex. 2 | 40 | 45 | 5 | 70 | 30 | None | None |
| Ex. 3 | 15 | 20 | 5 | 60 | 40 | None | None |
| Ex. 4 | 40 | 40 | 0 | 60 | 30 | None | None |
| Ex. 5 | 40 | 55 | 10 | 80 | 30 | None | None |
| C.E. 1 | 60 | 60 | 0 | 90 | 60 | Present | Present |
| C.E. 2 | 10 | 55 | 65 | 70 | 20 | Present | None |
| C.E. 3 | 40 | 45 | 5 | 50 | 30 | Present | Present |
| C.E. 4 | 40 | 45 | 5 | 100 | 20 | Present | None |

Example 2 to 5, Comparative Examples 1 to 4

Honeycomb structures were prepared in the same manner as in Example 1 except that an attack angle θ1, a pressurization face tilt angle θ2, a pressurization member tilt angle θ3, the hardness of a pressurization member and a flat end face ratio were changed as shown in Table 1. In the same manner as in Example 1, 'the presence/absence of bubbles in plugged portions' and 'the presence/absence of recesses in the surfaces (end faces) of the plugged portions' were evaluated. Results are shown in Table 1.

It is seen from Examples 1 to 3 and Comparative Examples 1 and 2 of Table 1 that when the attack angle is smaller than 15°, recesses are formed in the surfaces of the plugged portions. Moreover, it is seen that when the attack angle exceeds 50°, the bubbles are formed in the plugged portions, and the recesses are formed in the surfaces of the plugged portions. Furthermore, it is seen from Examples 4 and 5 and Comparative Examples 3 and 4 that when the hardness of the pressurization member is lower than 60 degrees, the bubbles are formed in the plugged portions, and the recesses are formed in the surfaces of the plugged portions. In addition, it is seen that when the hardness of the pressurization member is higher than 90 degrees, the recesses are formed in the surfaces of the plugged portions.

The honeycomb structure of the present invention can suitably be utilized for the disposal of fine particles or harmful substances in an exhaust gas from an internal combustion engine, a boiler or the like. In addition, the honeycomb structure can also be applied to a device for removing harmful substances from a device which discharges a large amount of soot and smoke.

DESCRIPTION OF REFERENCE NUMERALS

2: cell
3: partition wall
4: outer peripheral wall
5: plugged portion
7: outward end face
7a: inward end face
8: plugging depth
11: end face on inlet side
12: end face on outlet side
21: sheet
22: formed honeycomb article
23: container (container for plugging)
24: plugging material
25: cell
26: press-in means
27: recess portion
28: hole
31: first press-in device
32: inverting device
32a: elevating mechanism
32b: inverting mechanism
33: plugging material before charging
34: second press-in device
37: fixing table
37a: table portion
37b: leg portion
38: drying device
41: pressurization member
42: pressurization face
43: press-in jig
44: support portion
45: flat face
46: ridgeline
$\theta 1$: attack angle
$\theta 2$: pressurization face tilt angle
$\theta 3$: pressurization member tilt angle
N: normal line
C: pressurization member reference line
100, 200: honeycomb structure

What is claimed:

1. A method for manufacturing a honeycomb structure, comprising:
    a masking process of attaching a sheet to one end face of a formed honeycomb article comprising porous partition walls via which a plurality of cells constituting through channels for a fluid are partitioned and an outer peripheral wall positioned in the outermost periphery of the article, and making holes in the positions of the sheet superimposed on the cells in which plugged portions are to be formed;
    a first press-in process of pressing the end of the formed honeycomb article, to which the sheet is attached, into a container in which a plugging material is received, to press the plugging material into the cells via the one end face of the formed honeycomb article through the holes formed in the sheet; and
    a second press-in process of moving, along the surface of the sheet, a press-in jig including a pressurization member having a hardness of 60 to 90 degrees, having a plate-like shape, chamfered along one side of the shape perpendicular to a thickness direction and having a flat face disposed adjacent to the chamfered face in parallel with the thickness direction, in a state where an angle between a pressurization face which is the chamfered face and the sheet is from 15 to 50°, to press, by the pressurization face, the plugging material supplied between the sheet and the pressurization face into the cells in which the plugging material is charged, over the plugging material, through the holes formed in the sheet.

2. The method for manufacturing the honeycomb structure according to claim 1, wherein the length of the flat face in the thickness direction of the pressurization member is a length of 20 to 40% of the thickness of the pressurization member.

3. The method for manufacturing the honeycomb structure according to claim 1, wherein the material of the pressurization member contains a rubber.

* * * * *